(No Model.)
J. W. PARRISH.
CHURN.
No. 410,437. Patented Sept. 3, 1889.
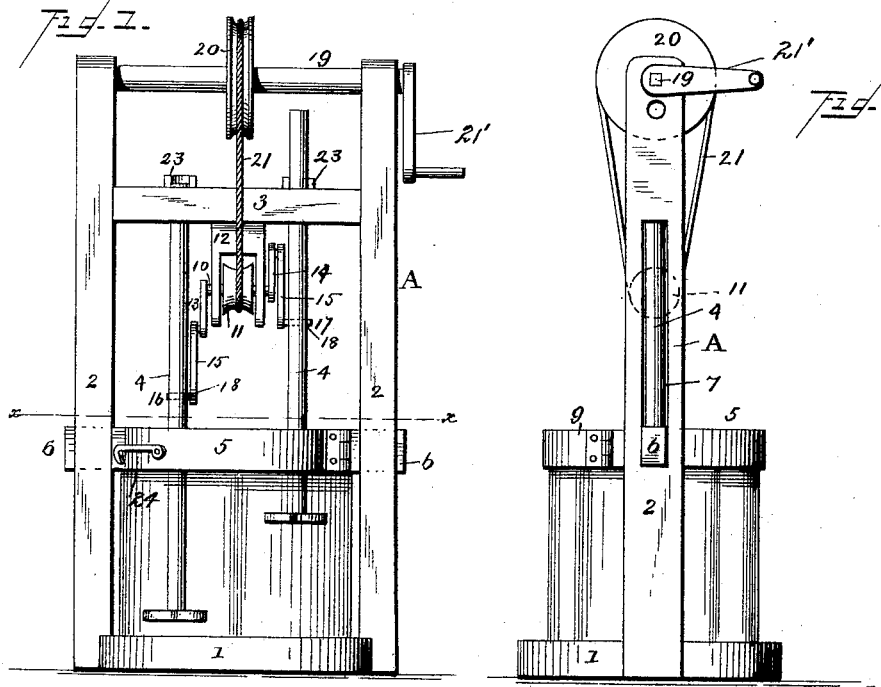
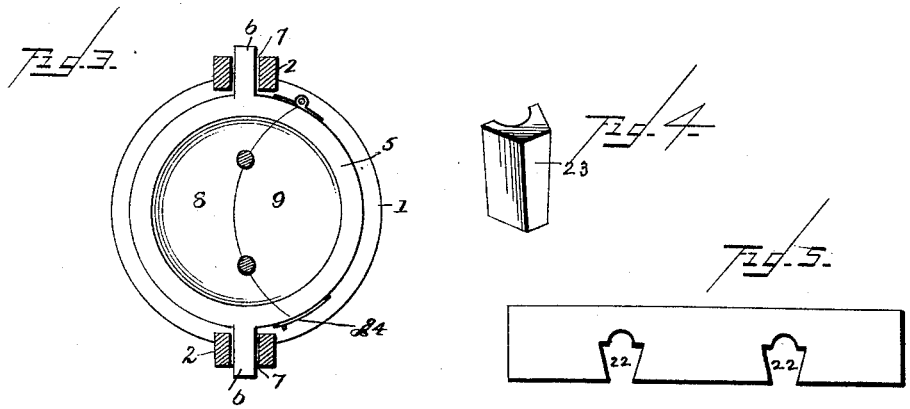
WITNESSES
F. L. Durand.
R. W. Elliott.
INVENTOR
John W. Parrish
By Dodd Dagger & Co.,
Attorneys.

UNITED STATES PATENT OFFICE.

JOHN W. PARRISH, OF MILTON, WEST VIRGINIA.

CHURN.

SPECIFICATION forming part of Letters Patent No. 410,437, dated September 3, 1889.

Application filed March 23, 1889. Serial No. 304,423. (No model.)

*To all whom it may concern:*

Be it known that I, JOHN W. PARRISH, a citizen of the United States, and a resident of Milton, in the county of Cabell and State of West Virginia, have invented certain new and useful Improvements in Churns; and I do hereby declare that the following is a full, clear, and exact description of the invention, whch will enable others skilled in the art to which it appertains to make and use the same.

This invention relates to churns.

The object is to produce a churn having a double dasher and mechanism for operating the same, whereby a constant reciprocating motion is maintained within the churn; furthermore, to produce a churn which shall be simple of construction, efficient and durable in use, and comparatively inexpensive of production.

With these objects in view the invention consists in the improved construction and novel combination of parts of a churn, as will be hereinafter fully described in the specification, illustrated in the drawings, and pointed out in the claims.

In the accompanying drawings, forming part of this specification, in which like letters of reference indicate corresponding parts, I have illustrated one form of device embodying the essential features of my invention, although the same may be carried into effect in other ways without in the least departing from the spirit thereof, and in these drawings—

Figure 1 is a front elevation of my improved churn. Fig. 2 is a side elevation. Fig. 3 is a horizontal section taken on the line $x$ $x$ of Fig. 1. Fig. 4 is a detail view of one of the movable bearings for holding the shaft of the dasher in place, and Fig. 5 is a top plan view of the cross-piece in which the dasher-shafts move.

Referring to the drawings, A designates the frame of the churn, consisting of the base 1, upon which the body of the churn rests, the uprights 2, secured thereto and extending up, and carrying at a point near their upper ends a cross-piece 3, in which the upper ends of the dasher-shafts 4 work. The lower ends of these shafts work through a cap 5, provided on each side with wings 6, which are arranged in slots 7, formed in the side of the uprights. This cap is made in two sections 8 and 9, the section 8 being provided with the wings 6, and the section 9 being hinged to the said winged section and adapted to be turned out to facilitate the removal of the dashers.

The mechanism for operating the dashers consists in a shaft 10, secured within a pulley 11, working in a hanger 12, secured to the under side of the cross-piece 3. At each end of this shaft are secured the cranks 13 and 14, which are pivoted to plates 15, carrying on their lower ends pintles 16 and 17, which fit in openings 18, formed in the dasher-shaft.

At the upper end of the frame is journaled a shaft 19, upon which is rigidly secured a pulley 20, around which passes a belt 21, extending down and passing around the pulley 11 on the shaft 10. The outer end of the shaft 19 carries a crank 21', by means of which a rotary motion may be imparted to the shaft 19 as desired.

The cross-piece 3 is provided with two dovetailed grooves or recesses 22, and in these recesses fit dovetailed bearings 23, which, when it is desired to remove the dasher-shafts, are drawn out and thereby release the said shafts; but when the churn is in operation they are forced in place, thereby preventing the said shaft working out.

It will be readily seen from the foregoing description that when the crank 21' is turned a rotary motion will be imparted to the shaft 10 through the medium of the belt, and that the cranks upon the said shaft will be rotated, thereby imparting a vertical reciprocating motion to the dashers. As the cranks are set at different angles—that is, when one dasher is down the other is up—it will be readily seen that a constant reciprocating motion is given to the two dashers, thereby tending to agitate the milk within the churn more violently than where one dasher is used. It is to be understood, however, that an ordinary receptacle may be used for containing the milk to be churned, and is held in place by means of the cap 5, before mentioned. Should it be desired to remove the dashers for any cause, it will be only necessary to unloose the hook 24 on the movable section 9 of the cap, swing the said section back, and withdraw the dovetailed bearings 23, when the dasher-shafts may be removed without any trouble.

It will thus be seen that, although this peculiar construction of a churn is exceedingly simple, it will be found of the highest efficiency and durability in use, and may be constructed at a small cost.

Having thus fully described my invention, what I claim as new, and desire to secure by Letters Patent, is—

1. The herein-described churn, consisting of the base, the uprights rising therefrom, having the slots in the sides thereof, the sectional cover, one of the sections thereof having wings fitting in said slots, the cross-piece having the dovetailed recesses therein, the dovetailed bearings fitting in said recesses, the dasher-shafts fitting in said bearings, the plates connected to said shafts, the double cranks connected to said plates, the shaft and pulley for operating the cranks, the hanger for the pulley-shaft, and the driving-band pulley and shaft, all arranged and adapted to operate substantially as and for the purpose described.

2. In a churn, the combination of the uprights having slots therein, the cover having wings fitting in said slots, the dasher-shafts, plates, and double crank for operating the same, the cross-piece having dovetailed recesses to receive the dasher-shafts, and the dovetailed bearings fitting in said recesses, substantially as described.

3. In a churn, the combination of the driving-shaft and driving-pulley, the driving-cord, the pulley and double cranks, the plates, the dasher-shafts connected to the plates, the cover having wings, and the uprights having slots to receive the wings, substantially as described.

In testimony that I claim the foregoing as my own I have hereunto affixed my signature in presence of two witnesses.

JOHN W. PARRISH.

Witnesses:
J. W. WEEKLY,
M. L. CHANDLER.